(12) United States Patent
Winely

(10) Patent No.: US 11,215,265 B2
(45) Date of Patent: Jan. 4, 2022

(54) STATIC CURVIC JOINT FOR EPICYCLICAL GEAR SYSTEM HOUSING ASSEMBLY

(71) Applicant: Rolls-Royce Corporation, Indianapolis, IN (US)

(72) Inventor: Mark Winely, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/592,499

(22) Filed: Oct. 3, 2019

(65) Prior Publication Data
US 2021/0102604 A1  Apr. 8, 2021

(51) Int. Cl.
*F16H 1/28* (2006.01)

(52) U.S. Cl.
CPC ......... *F16H 1/2827* (2013.01); *F16H 1/2863* (2013.01); *F16H 2001/2881* (2013.01)

(58) Field of Classification Search
CPC .......... F16H 57/082; F16H 2001/2881; F16H 1/2827; F16H 1/46
See application file for complete search history.

(56) References Cited

U.S. PATENT DOCUMENTS

| | | | |
|---|---|---|---|
| 4,158,971 A * | 6/1979 | Szalai | B60K 17/046 475/343 |
| 4,590,820 A | 5/1986 | Hambric | |
| 4,656,890 A * | 4/1987 | Marquardt | F16D 1/076 475/348 |
| 5,366,423 A | 11/1994 | Mori et al. | |
| 5,944,429 A * | 8/1999 | Berry | F16C 19/163 384/493 |
| 6,148,605 A | 11/2000 | Lardellier | |
| 7,008,348 B2 | 3/2006 | LaBath | |
| 7,399,252 B2 * | 7/2008 | Kingston | F16H 57/082 475/331 |

(Continued)

FOREIGN PATENT DOCUMENTS

| | | | |
|---|---|---|---|
| DE | 102009002920 A1 * | 11/2010 | ........... F16H 57/082 |
| EP | 1262683 A1 | 12/2002 | |

(Continued)

OTHER PUBLICATIONS

U.S. Appl. No. 16/592,492, by Rolls-Royce Corporation (Inventors: Bennett et al.), filed Oct. 3, 2019.

(Continued)

*Primary Examiner* — Sherry L Estremsky
(74) *Attorney, Agent, or Firm* — Shumaker & Sieffert, P.A.

(57) ABSTRACT

A planet gear housing assembly in an epicyclical gear assembly comprises an aft planet gear assembly and a forward planet gear assembly. The aft planet carrier assembly comprises an aft flange defining a central aperture and an annular mounting flange positioned forward of and coaxial with said central aperture, said mounting flange forming a forward facing mounting surface comprising a curvic structure. The forward planet carrier assembly comprises a forward flange defining a central aperture and an annular mounting flange positioned aft of and coaxial with said central aperture, said mounting flange forming an aft facing mounting surface comprising a curvic structure. The curvic structures of the mounting surfaces are positioned relative to each other to thereby form a static curvic joint.

17 Claims, 9 Drawing Sheets

(56) References Cited

U.S. PATENT DOCUMENTS

| | | | |
|---|---|---|---|
| 8,171,605 B2 | 5/2012 | York et al. | |
| 8,287,421 B2 * | 10/2012 | Ciszak | F16H 57/082 |
| | | | 475/331 |
| 8,550,957 B2 | 10/2013 | Erno et al. | |
| 8,585,539 B2 | 11/2013 | Sheridan et al. | |
| 9,115,756 B2 | 8/2015 | Tecza | |
| 9,518,612 B2 | 12/2016 | Brathwaite et al. | |
| 9,926,850 B2 | 3/2018 | Sheridan | |
| 10,041,579 B2 | 8/2018 | Venter | |
| 10,100,642 B2 * | 10/2018 | Morrison | F01D 5/066 |
| 10,316,665 B2 | 6/2019 | Virkler | |
| 10,752,352 B2 * | 8/2020 | Brand | B64C 27/28 |
| 2005/0130792 A1 * | 6/2005 | Drago | F16H 1/28 |
| | | | 475/331 |
| 2010/0007150 A1 | 1/2010 | Ciszak et al. | |
| 2014/0234087 A1 | 8/2014 | Marshall | |
| 2015/0354672 A1 | 12/2015 | Bouwer et al. | |
| 2017/0175753 A1 * | 6/2017 | Tan-Kim | F01D 21/045 |
| 2017/0191369 A1 | 7/2017 | Partyka et al. | |
| 2017/0284474 A1 | 10/2017 | Chang | |
| 2018/0010525 A1 | 1/2018 | Madge | |
| 2019/0024755 A1 | 1/2019 | Gravina et al. | |
| 2019/0112985 A1 | 4/2019 | Gravina | |
| 2019/0234510 A1 | 8/2019 | Brillon et al. | |
| 2019/0345876 A1 * | 11/2019 | Goumas | F02K 3/06 |
| 2020/0018181 A1 * | 1/2020 | Brault | F02K 3/06 |

FOREIGN PATENT DOCUMENTS

| | | |
|---|---|---|
| EP | 3029359 A | 6/2016 |
| EP | 3263952 A1 | 1/2018 |
| JP | S5481458 A | 6/1979 |

OTHER PUBLICATIONS

U.S. Appl. No. 16/592,498, by Rolls-Royce Corporation (Inventor: Winely), filed Oct. 3, 2019.

Douglass, Howard D., et al., monograph: "Liquid Rocket Engine Turbopump Shafts and Couplings," NASA Space Vehicle Design Criteria (Chemical Propulsion), Sep. 1972, NASA SP-8101.

Extended Search Report from counterpart European Application No. 20194254.7, dated Jan. 22, 2021, 9 pp.

Response to Extended Search Report dated Jan. 22, 2021, from counterpart European Application No. 20194254.7, filed Oct. 6, 2021, 51 pp.

\* cited by examiner

STATIC CURVIC JOINT FOR EPICYCLICAL GEAR SYSTEM HOUSING ASSEMBLY

CROSS-REFERENCE TO RELATED APPLICATIONS

This application is related to concurrently filed and co-pending U.S. patent application Ser. No. 16/592,492 entitled "EPICYCLICAL GEAR SYSTEM HOUSING ASSEMBLY," U.S. patent application Ser. No. 16/592,494 entitled "BEARING SPRING FOR EPICYCLICAL GEAR SYSTEM HOUSING ASSEMBLY," and U.S. patent application Ser. No. 16/592,498 entitled "STIFFENING MEMBER FOR EPICYCLICAL GEAR SYSTEM HOUSING ASSEMBLY," the entirety of each of which are herein incorporated by reference.

BACKGROUND

Epicyclical gear systems may be used in rotating machinery to transfer energy from one component, such as a rotatable shaft, to another. By altering certain variables such as the number, size, and teeth of the gears, an epicyclical gear system may be designed to transfer energy between components at a desired ratio and often convert a high-speed, low-torque input to a lower-speed, higher-torque output.

Epicyclical gear systems may be suitable for a wide range of applications, including the transfer of energy from a turbine shaft to a fan rotor in a geared turbofan engine. However, in such dynamic applications the epicyclical gear system must be designed to allow some degree of relative movement between parts of the system to avoid excessive wear and, in extreme conditions, system failure.

SUMMARY

According to some aspects of the present disclosure, a planet gear housing assembly in an epicyclical gear assembly comprises an aft planet carrier assembly, a forward planet carrier assembly, and a plurality of planet gears. The aft planet carrier assembly comprises an aft flange and an annular mounting flange. The aft flange defines a central aperture and a plurality of gear shaft pockets positioned about the circumference and radially outward of the central aperture, each pocket having a cylindrical wall. The annular mounting flange is positioned forward of and coaxial with the central aperture and forms a forward facing mounting surface comprising a curvic structure. The forward planet carrier assembly comprises a forward flange and an annular mounting flange. The forward flange defines a central aperture and a plurality of gear shaft pockets positioned about the circumference and radially outward of the central aperture, each pocket having a cylindrical wall. The annular mounting flange is positioned aft of and coaxial with the central aperture and forms an aft facing mounting surface comprising a curvic structure. The plurality of planet gears each comprise a cylindrical shaft having a forward end portion disposed in a gear shaft pocket of the forward planet carrier assembly coaxially with the cylindrical wall of the pocket, an aft end portion disposed within a gear shaft pocket of the aft planet carrier assembly coaxially with the cylindrical wall of the pocket, and one or more gears carried by the shaft between the forward and aft end portions. The curvic structures of the mounting surfaces are positioned relative to each other to thereby form a static curvic joint.

In some embodiments the annular mounting flange of the aft planet carrier assembly extends from the aft flange. In some embodiments the annular mounting flange of the forward planet carrier assembly extends from the forward flange. In some embodiments one or both of the annular mounting flange of the aft planet carrier assembly and the annular mounting flange of the forward planet carrier assembly extends substantially perpendicularly from a respective one of the aft flange and the forward flange.

In some embodiments the aft flange comprises a radially outer mounting surface for mounting the planet gear housing assembly to an engine casing. In some embodiments the curvic structure of the aft facing mounting surface comprises a plurality of teeth extending away from the aft facing mounting surface. In some embodiments the aft facing mounting surface defines a plurality of fastener bores, with each fastener bore of the plurality of fastener bores positioned between adjacent teeth of the plurality of teeth. In some embodiments the curvic structure of the forward facing mounting surface comprises a plurality of teeth extending away from the forward facing mounting surface. In some embodiments the forward facing mounting surface defines a plurality of fastener bores, with each fastener bore of the plurality of fastener bores positioned between adjacent teeth of the plurality of teeth. In some embodiments the static curvic joint comprises the plurality of teeth extending away from the aft facing mounting surface enmeshed with the plurality of teeth extending away from the forward facing mounting surface. In some embodiments the static curvic joint further comprises a plurality of fasteners, with each fastener of the plurality of fasteners positioned through an aligned pair of fastener bores.

According to further aspects of the present disclosure, a gas turbine engine for an aircraft comprises an engine core, a fan, and a gearbox. The engine core comprises a turbine, a compressor, and a core shaft connecting the turbine to the compressor. The fan is located upstream of the engine core and comprises a plurality of fan blades. The gearbox receives an input from the core shaft and outputs drive to the fan so as to drive the fan at a lower rotational speed than the core shaft. The gearbox has a planet gear housing assembly comprising an aft planet carrier assembly, a forward planet carrier assembly, and a plurality of planet gears. The aft planet carrier assembly comprises an aft flange and an annular mounting flange. The aft flange defines a central aperture and a plurality of gear shaft pockets positioned about the circumference and radially outward of the central aperture, each pocket having a cylindrical wall. The annular mounting flange is positioned forward of and coaxial with the central aperture and forms a forward facing mounting surface comprising a curvic structure. The forward planet carrier assembly comprises a forward flange and an annular mounting flange. The forward flange defines a central aperture and a plurality of gear shaft pockets positioned about the circumference and radially outward of the central aperture, each pocket having a cylindrical wall. The annular mounting flange is positioned aft of and coaxial with the central aperture and forms an aft facing mounting surface comprising a curvic structure. The plurality of planet gears each comprise a cylindrical shaft having a forward end portion disposed in a gear shaft pocket of the forward planet carrier assembly coaxially with the cylindrical wall of the pocket, an aft end portion disposed within a gear shaft pocket of the aft planet carrier assembly coaxially with the cylindrical wall of the pocket, and one or more gears carried by the shaft between the forward and aft end portions. The curvic structures of the mounting surfaces are positioned relative to each other to thereby form a static curvic joint.

In some embodiments each of the plurality of planet gears comprise a sun gear engaging gear and a ring gear engaging gear carried by the shaft between the forward and aft end portions. In some embodiments the shaft and gears form a compound star gear in an epicyclical gear system. In some embodiments the gearbox further comprises a roller element bearing disposed over at least a portion of one or both of the forward end portion and the aft end portion of the gear shaft. In some embodiments the curvic structure of the aft facing mounting surface and the forward facing mounting surface each comprise a plurality of teeth extending away from the respective one of the aft facing mounting surface and the forward facing mounting surface.

According to still further aspects of the present disclosure, a method is disclosed for reducing relative movement between static components of an epicyclical gear system. The method comprises providing a static aft planet carrier assembly, providing a static forward planet carrier assembly, and coupling the aft planet carrier assembly and forward planet carrier assembly. The static aft planet carrier assembly comprises an aft flange defining a central aperture and an annular mounting flange positioned forward of and coaxial with the central aperture. The mounting flange forms a forward facing mounting surface comprising a curvic structure. The static forward planet carrier assembly comprises a forward flange defining a central aperture and an annular mounting flange positioned aft of and coaxial with the central aperture. The mounting flange forms an aft facing mounting surface comprising a curvic structure. The aft planet carrier assembly and the forward planet carrier assembly are coupled by mating the curvic structure of the forward facing mounting surface to the curvic structure of the aft facing mounting surface to thereby form a static curvic joint.

In some embodiments the aft flange further defines a plurality of gear shaft pockets positioned about the circumference and radially outward of the central aperture, each pocket having a cylindrical wall. In some embodiments the forward flange further defines a plurality of gear shaft pockets positioned about the circumference and radially outward of the central aperture, each pocket having a cylindrical wall. In some embodiments the coupling of the aft planet carrier assembly and the forward planet carrier assembly forms a plurality of axially aligned gear shaft pocket pairs.

In some embodiments the method of further comprises positioning one planet gear of a plurality of planet gears in each of the plurality of axially aligned gear shaft pocket pairs, each planet gear comprising a cylindrical shaft having a forward end portion disposed in a gear shaft pocket of the forward planet carrier assembly coaxially with the cylindrical wall of the pocket, an aft end portion disposed within a gear shaft pocket of the aft planet carrier assembly coaxially with the cylindrical wall of the pocket, and one or more gears carried by the shaft between the forward and aft end portions. In some embodiments the method of further comprises positioning a bearing at least partly in a gear shaft pocket and carrying a portion of a cylindrical shaft of a planet gear with the bearing. In some embodiments the method of further comprises rotating the cylindrical shaft of each planet gear while maintaining the curvic joint static. In some embodiments the rotation is driven by a sun gear of a compound star gear assembly.

BRIEF DESCRIPTION OF THE DRAWINGS

The following will be apparent from elements of the figures, which are provided for illustrative purposes.

Figure 1:
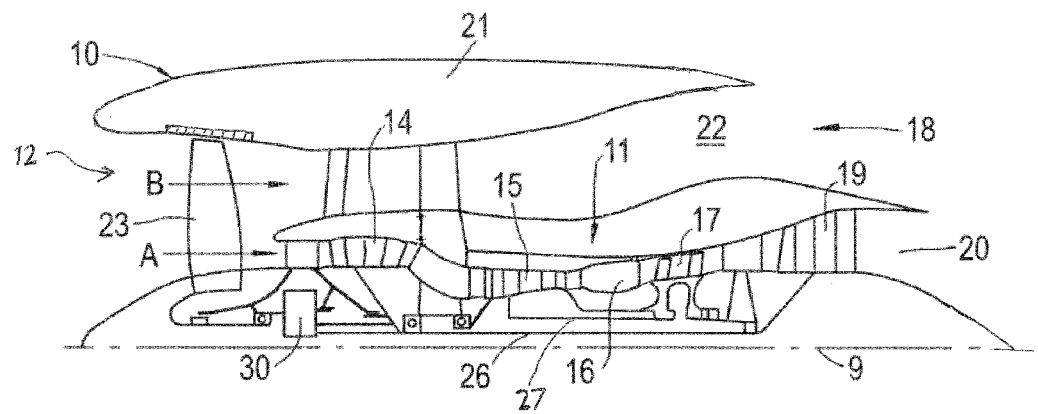
FIG. 1 is a sectional side view of a gas turbine engine.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg−1 s, 105 Nkg−1 s, 100 Nkg−1 s, 95 Nkg−1 s, 90 Nkg−1 s, 85 Nkg−1 s or 80 Nkg−1 s. The specific thrust may be in an inclusive range bounded by any two of the values in the previous sentence (i.e. the values may form upper or lower bounds), for example in the range of from 80 Nkg−1 s to 100 Nkg−1 s, or 85 Nkg−1 s to 95 Nkg−1 s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
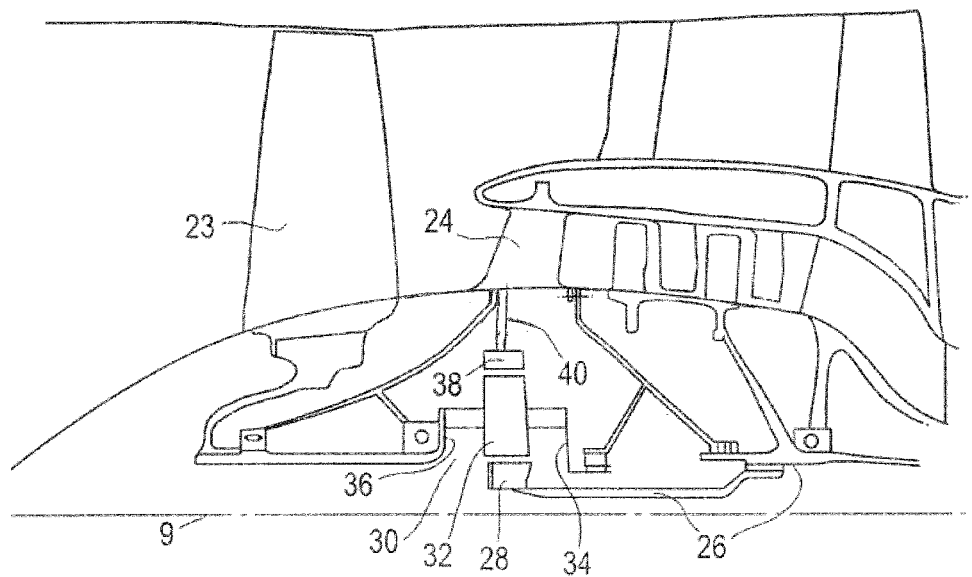
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
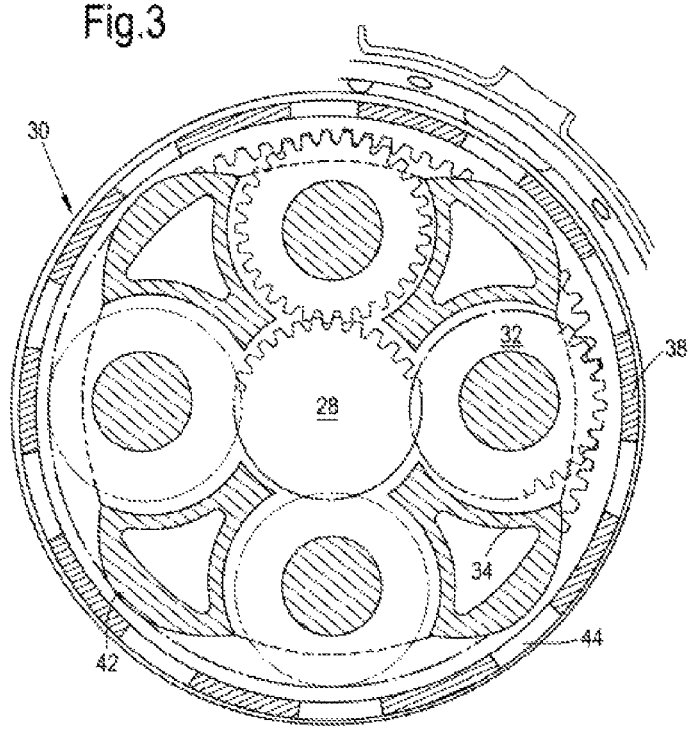
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
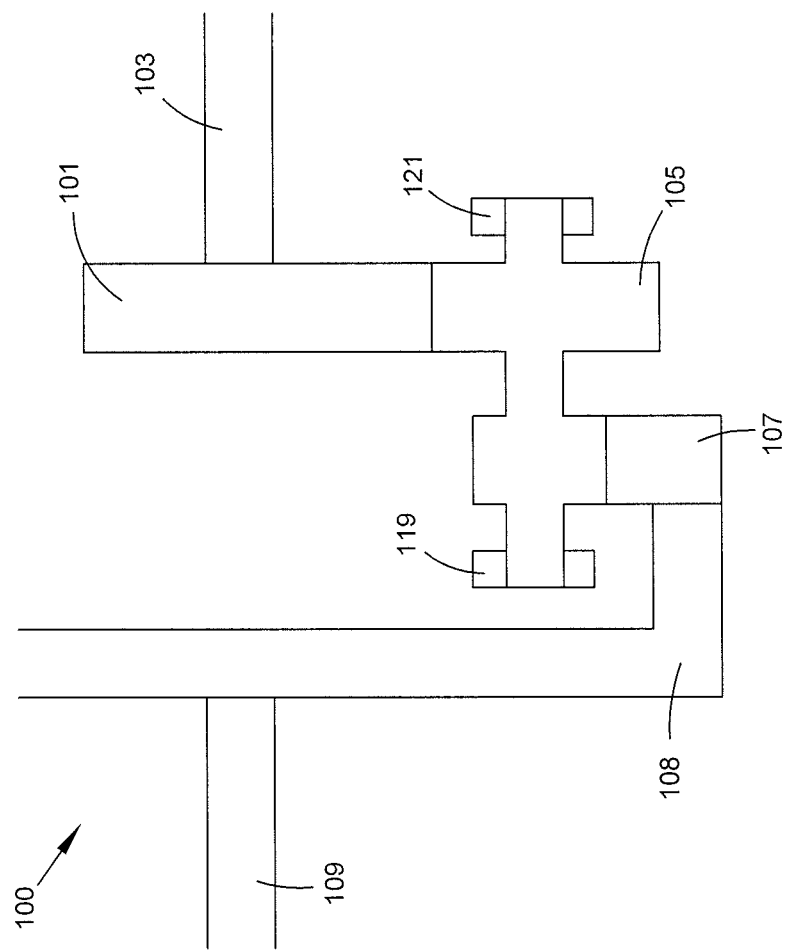
FIG. 4 is a schematic and cross sectional view of an epicyclical gear system in accordance with some embodiments of the present disclosure.

FIG. 4 provides a schematic view of an epicyclical gear system 100 in accordance with some embodiments of the present disclosure. The epicyclical gear system 100 may be a compound star gear system. A sun gear 101 is coupled to and driven by a first rotatable shaft 103. The sun gear 101 is engaged with one or more planet gears 105, such that rotation of the sun gear 101 causes rotation of the one or more planet gears 105. The planet gears 105 may be star gears, such that the planet gears 105 rotate about an axis that is fixed relative to the axis of rotation of the sun gear 101.

Each of the one or more planet gears 105 are engaged with a ring gear 107. The ring gear 107 is coupled via a ring gear hub 108 to a second rotatable shaft 109. Rotation of the first rotatable shaft 103 thus drives rotation of the second rotatable shaft 109 via rotation of the sun gear 101, one or more planet gears 105, and ring gear 107. In some embodiments, the first rotatable shaft 103 may be a turbine shaft (i.e. high or low speed spool) of a turbine engine, and the second rotatable shaft 109 may be a fan shaft or fan rotor.

Figure 5:
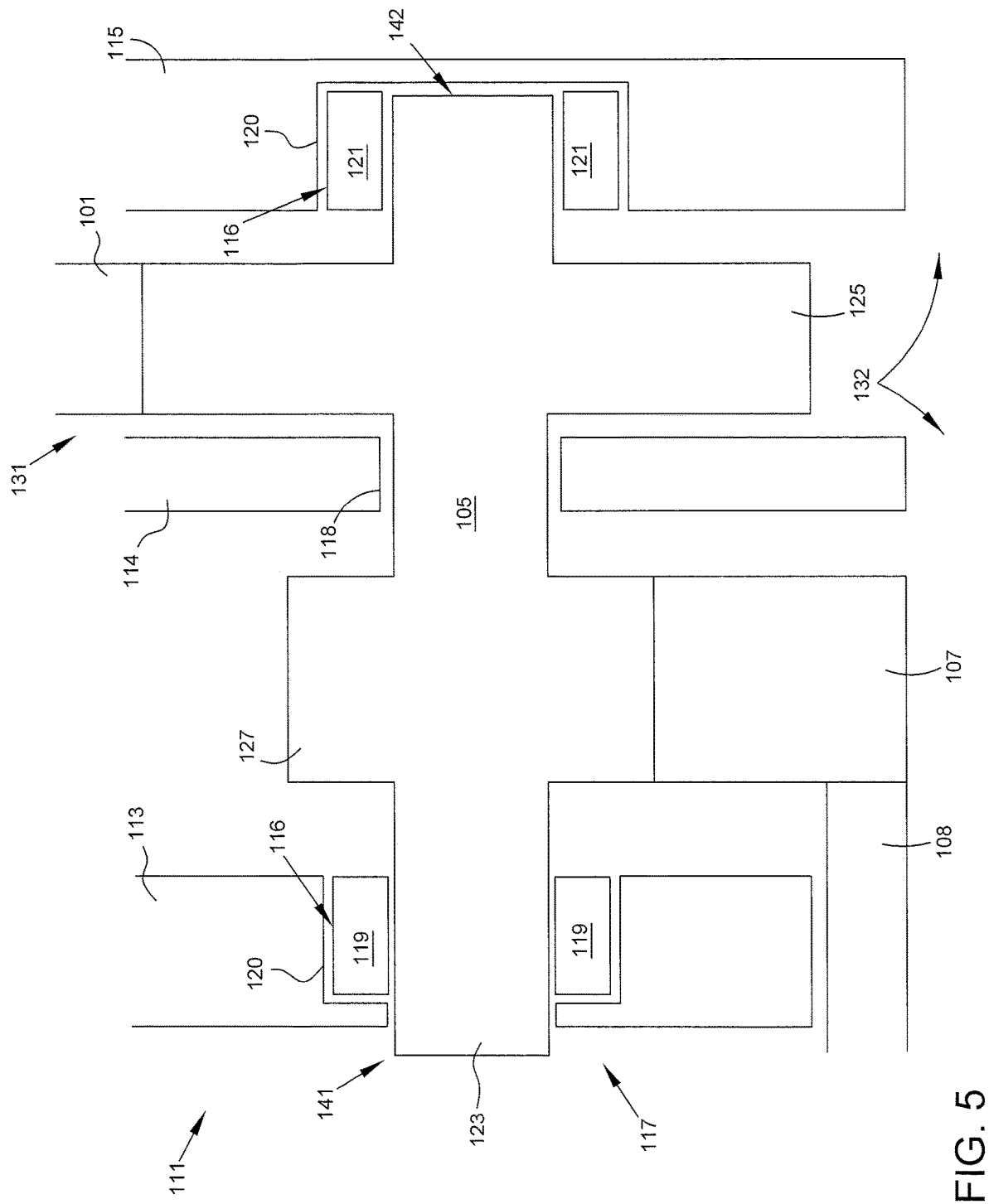
FIG. 5 is a detailed schematic and cross sectional view of a planet gear disposed in an epicyclical gear system in accordance with some embodiments of the present disclosure.

FIG. 5 provides a detailed and schematic view of a housing assembly 111 of an epicyclical gear system 100 in accordance with some embodiments of the present disclosure. Each of the one or more planet gears 105 may comprise a cylindrical gear shaft 123, a sun gear engaging gear 125, and a ring gear engaging gear 127. The sun gear engaging gear 125 and ring gear engaging gear 127 may be carried by the cylindrical gear shaft 123. Each of the one or more planet gears 105 is carried by the housing assembly 111. The planet gears 105 may be a compound star gear of the epicyclical gear system 100.

The housing assembly 111 may comprise a forward housing member 113 and an aft housing member 115. In some embodiments, the housing assembly 111 further comprises an intermediate housing member 114. One or more of the housing members 113, 114, 115 may be joined together. The forward housing member 113 and aft housing member 115 each define a plurality of gear shaft pockets 116 having a cylindrical wall 120. The intermediate housing member 114 may define a plurality of bores 118.

A cylindrical gear shaft 123 of a planet gear 105 may have a forward end portion 141 disposed within one of the plurality of gear shaft pockets 116 formed by the forward housing member 113. The cylindrical gear shaft 123 of the same planet gear 105 may have an aft end portion 142 disposed within one of the plurality of gear shaft pockets 116 formed by the aft housing member 115. The cylindrical gear shaft 123 may be disposed within each gear shaft pocket 116 coaxially with the cylindrical wall 120 of the gear shaft pocket 116. The cylindrical gear shaft 123 may extend through the bore 118 defined by the intermediate housing member 114. The sun gear engaging gear 125 and ring gear engaging gear 127 of planet gear 105 may be carried by the gear shaft 123 between the forward end portion 141 and the aft end portion 142.

The housing assembly 111 may further comprise a bearing assembly 117. The housing assembly 111 may comprise a forward bearing assembly and an aft bearing assembly. The bearing assembly 117 may comprise a bearing. For example, a forward bearing 119 may be disposed over at least a portion of the forward end portion 141 of the gear shaft 123 and an aft bearing 121 may be disposed over at least a portion of the aft end portion 142 of the gear shaft 123. Each of the bearings 119, 121 may rotatably carry the planet gear 105. Each of the bearings 119, 121 may be a roller element bearing.

During operation of the epicyclical gear system 100 the constituent pieces of the system 100 as described above and including additional carrier assemblies, housings, and bearings, may move relative to one another. Even small changes in the relative positioning of one component to another can have significant impacts on performance of the system 100. For example, misalignment of enmeshed gear teeth and/or bearings can cause uneven gear and/or bearing loading, and degradation or damage to gear teeth. For example, misalignment of enmeshed gear teeth and/or bearings can cause uneven gear and/or bearing loading, degradation or damage to gear teeth, and reduction of bearing lives and bearing stability.

Of particular concern is the fore-to-aft alignment of the gear shaft 123 of each planet gear 105. Since each planet gear 105 is carried by the gear shaft 123 partly disposed within gear shaft pockets 116 of a forward housing member 113 and an aft housing member 115, relative movement or changes in relative positioning between the forward housing member 113 and aft housing member 115 can cause misalignment of the planet gear 105. Similarly, relative movement or changes in relative positioning between the intermediate housing member 114 and either or both of the forward housing member 113 and aft housing member 115 can cause misalignment of the planet gear 105.

This misalignment may in turn lead to uneven load sharing among the planet gears 105, gear degradation, and shortened useful life of the planet gears 105 and/or the planet bearings 119, 121. Factors that may contribute to planet gear misalignment include unaligned forces between the forward bearing 119 and aft bearing 121, manufacturing inaccuracies for the positions of the gear shaft pockets 116 and bore 118, ability to reassembly the forward and aft housings in the same position that they were machined, gear tolerance, and inflexibility and/or relative stiffness between each of the housing members 113, 114, 115.

The present disclosure is therefore directed to systems and methods for improving and maintaining planet gear alignment in an epicyclical gear system. More specifically, the present disclosure is directed to a planet gear housing assembly for an epicyclical gear system having an aft planet carrier assembly, a forward planet carrier assembly, and a plurality of planet gears each carried by the aft and forward planet carrier assemblies. A static curvic joint is provided between the aft planet carrier assembly and the forward planet carrier assembly.

Figure 7:
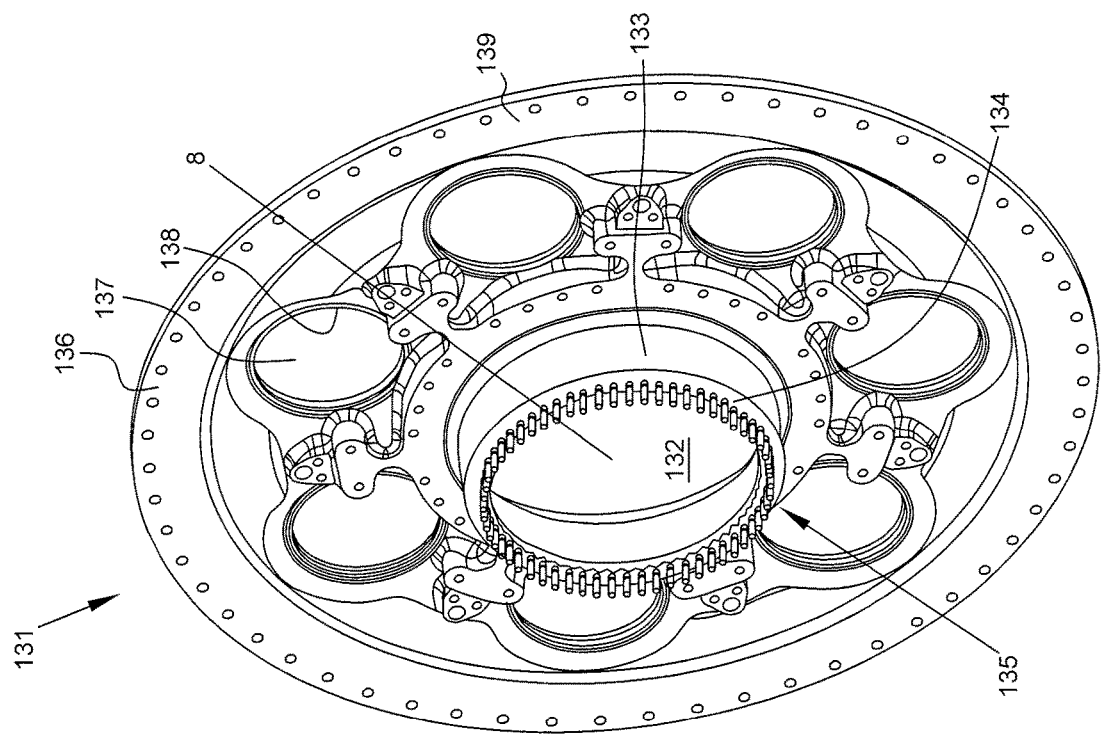
FIG. 7 is an isometric view of an aft planet carrier assembly of a planet gear housing assembly in accordance with some embodiments of the present disclosure.
Figure 6:
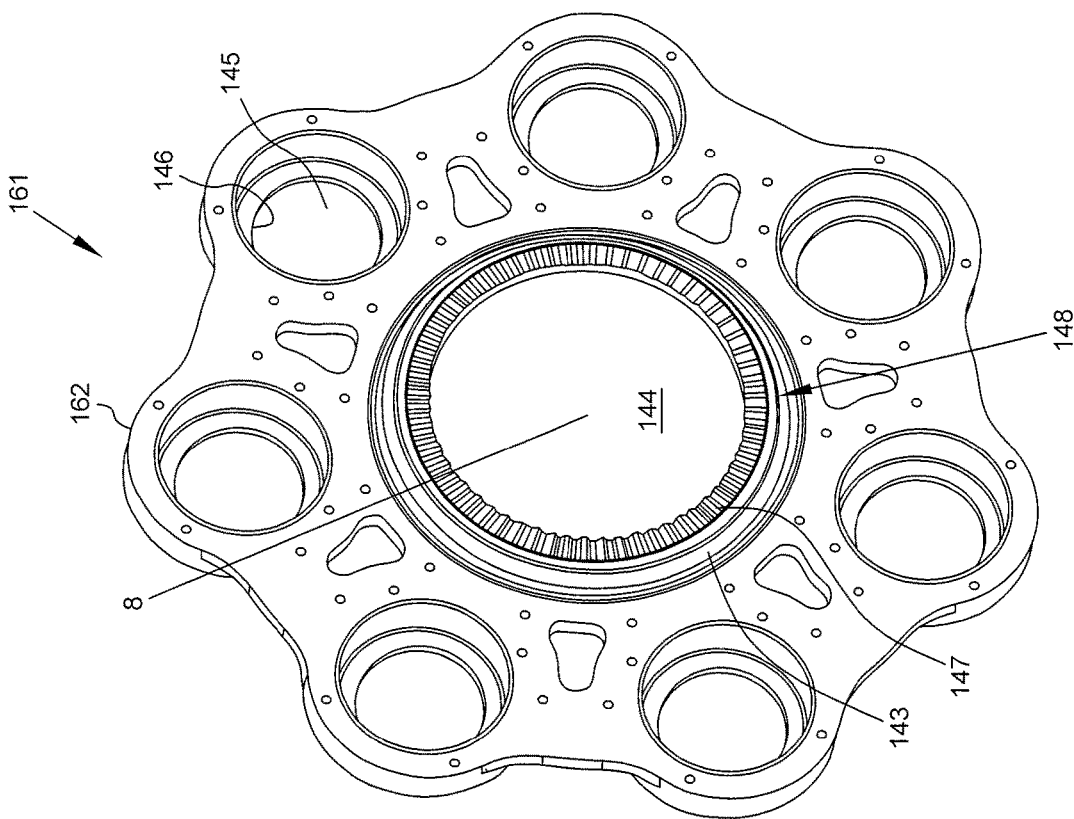
FIG. 6 is an isometric view of a forward planet carrier assembly of a planet gear housing assembly in accordance with some embodiments of the present disclosure.
Figure 8:
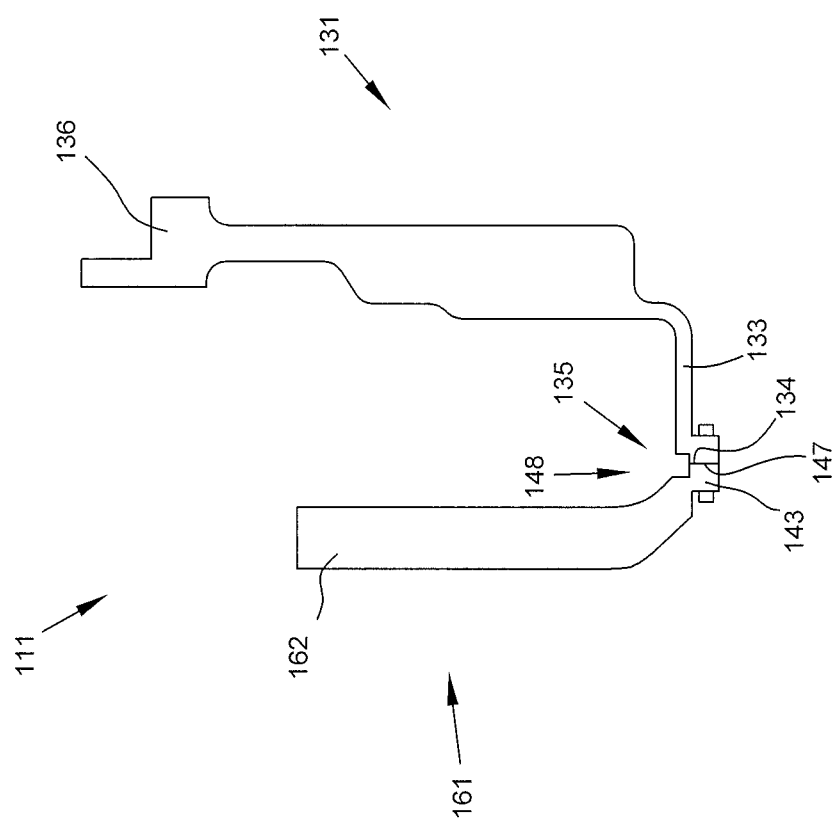
FIG. 8 is a partial cross sectional view of a forward planet carrier assembly coupled to an aft planet carrier assembly of a planet gear housing assembly in accordance with some embodiments.

As shown in FIGS. 4-8, a planet gear housing assembly 111 may comprise an aft planet carrier assembly 131, a forward planet carrier assembly 161, and a plurality of planet gears 105 each carried by the aft planet carrier assembly 131 and forward carrier planet assembly. FIG. 6 is an isometric view of a forward planet carrier assembly of a planet gear housing assembly in accordance with some embodiments of the present disclosure. FIG. 7 is an isometric view of an aft planet carrier assembly of a planet gear housing assembly in accordance with some embodiments of the present disclosure. FIG. 8 is a partial cross sectional view of a forward planet carrier assembly coupled to an aft planet carrier assembly of a planet gear housing assembly in accordance with some embodiments.

An aft planet carrier assembly 131 may comprise one or both of the intermediate housing member 114 and the aft housing member 115. The aft planet carrier assembly 131 may comprise an aft flange 136. The aft flange 136 may be the intermediate housing member 114, the aft housing member 115, or another flange member. The aft flange 136 may define a central aperture 132 and a plurality of gear shaft pockets 137 positioned about the circumference of and radially outward of the central aperture 132. Each of the gear shaft pockets 116 may have a cylindrical wall 138. In some embodiments the aft flange 136 may further comprise a radially outer mounting surface 139 for coupling the aft planet carrier assembly 131 to an engine casing.

The aft planet carrier assembly 131 may further comprise an annular mounting flange 133. The annular mounting flange 133 may be positioned forward of and coaxial with the central aperture 132. The annular mounting flange 133 may extend substantially perpendicularly from the aft flange 136. The annular mounting flange 133 may form a forward facing mounting surface 134 comprising a curvic structure 135.

A forward planet carrier assembly 161 may comprise a forward flange 162 and an annular mounting flange 143. The forward planet carrier assembly 161 may be the forward housing member 113. The forward flange 162 may define a central aperture 144 and a plurality of gear shaft pockets 145 positioned about the circumference and radially outward of the central aperture 144. Each gear shaft pocket 145 may have a cylindrical wall 146. The annular mounting flange 143 may be positioned aft of and coaxial with the central aperture 144. The annular mounting flange 143 may form an aft facing mounting surface 147 comprising a curvic structure 148. The annular mounting flange 143 may extend substantially perpendicularly from the forward flange 162.

A plurality of planet gears 105 may be carried by the forward planet carrier assembly 161 and the aft planet carrier assembly 131. Each of the planet gears 105 may comprise a cylindrical shaft 123 having a forward end portion 141 disposed in a gear shaft pocket 145 of the forward flange 162. The forward end portion 141 may be disposed in the gear shaft pocket 145 coaxial with the cylindrical wall 146 defining gear shaft pocket 145. The cylindrical shaft may have an aft end portion 142 disposed within a gear shaft pocket 137 of the aft flange 136, and may be disposed in the gear shaft pocket 137 coaxial with the cylindrical wall 138.

Each planet gear 105 may further comprise one or more gears carried by the cylindrical shaft 123 between the forward end portion 141 and the aft end portion 142. The gears may be, for example, a sun gear engaging portion 125 of the planet gear 105 and/or a ring gear engaging portion 127 of the planet gear 105.

Figure 9:
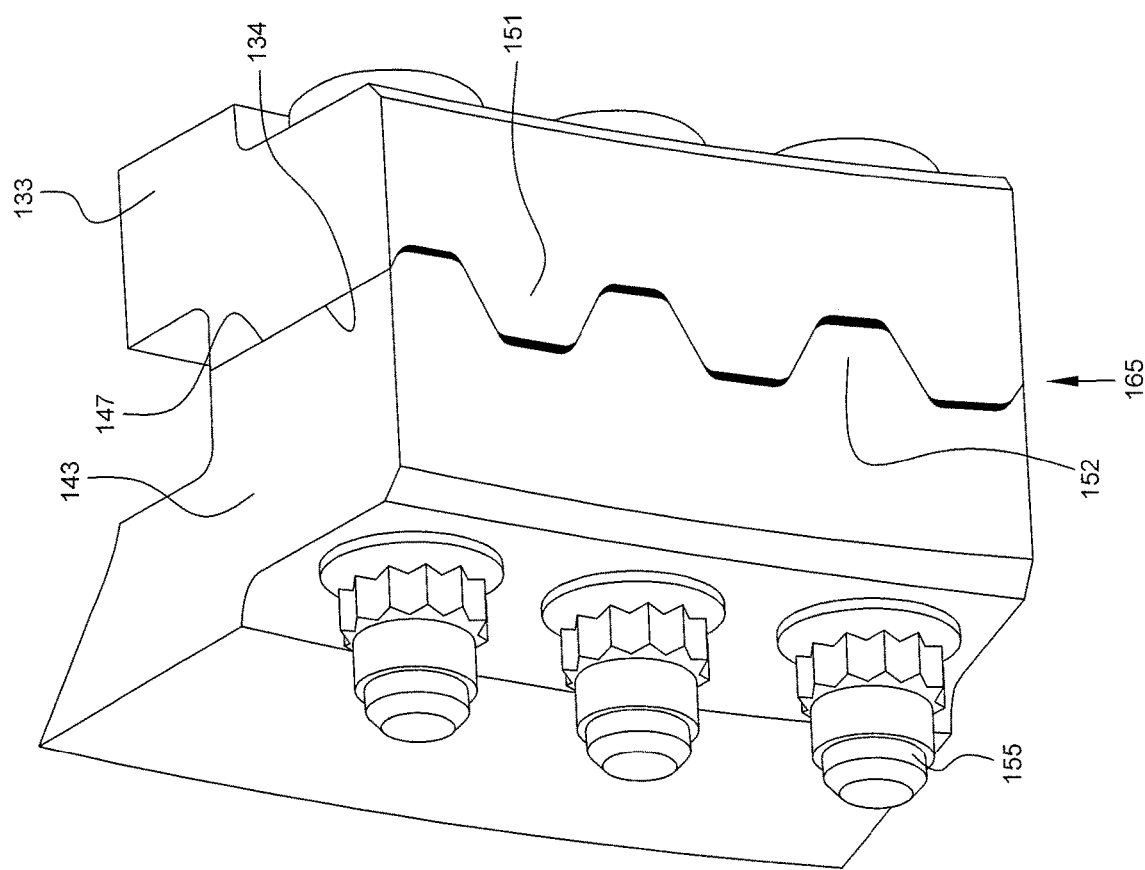
FIG. 9 is a partial isometric view of a forward planet carrier assembly coupled to an aft planet carrier assembly of a planet gear housing assembly in accordance with some embodiments.
Figure 11:
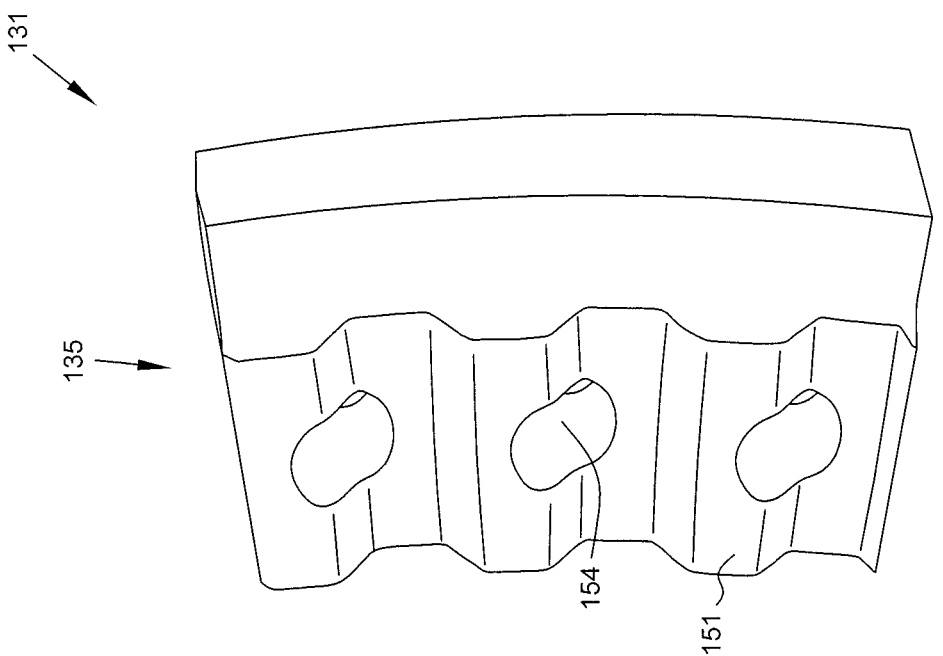
FIG. 11 is a partial isometric view of a curvic structure of an aft planet carrier assembly of a planet gear housing assembly in accordance with some embodiments.
Figure 10:
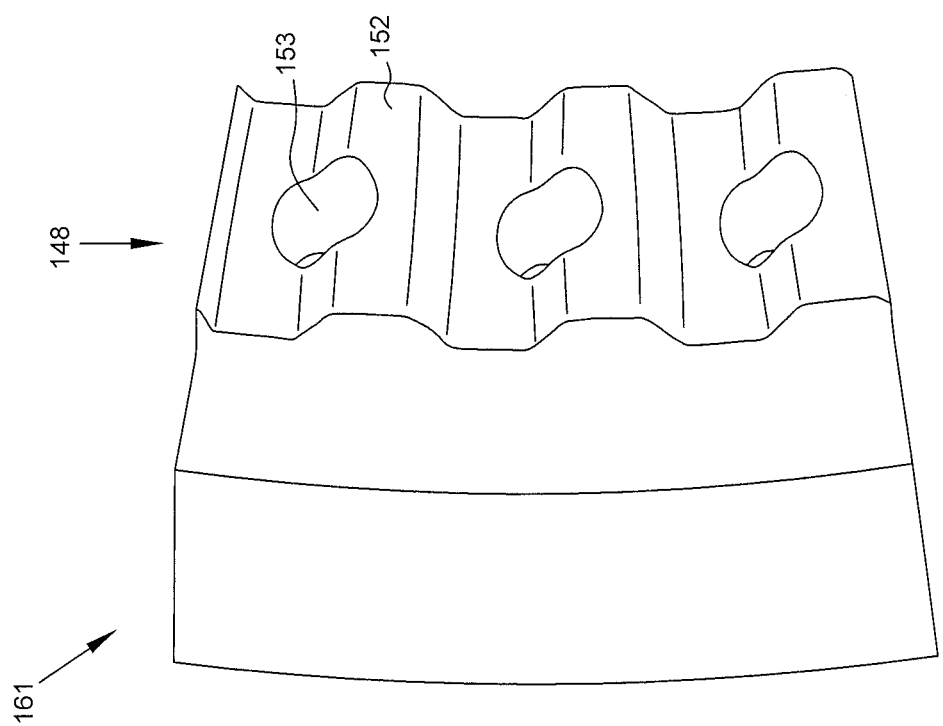
FIG. 10 is a partial isometric view of a curvic structure of a forward planet carrier assembly of a planet gear housing assembly in accordance with some embodiments.

The curvic structures 135, 148 of the aft planet carrier assembly 131 and the forward planet carrier assembly 161 may be positioned relative to each other to form a static curvic joint 165. A portion of the curvic structure 148 of the forward planet carrier assembly 161 is shown isometrically in FIG. 10. A portion of the curvic structure 135 of the aft planet carrier assembly 131 is shown isometrically in FIG. 11. FIG. 9 provides a partial isometric view of a curvic joint 165.

In some embodiments, the curvic structure 148 of the forward planet carrier assembly 161 may comprise a plurality of teeth 152 defined by and extending away from the aft facing mounting surface 147. The aft facing mounting surface 147 may further define a plurality of fastener bores 153, with each fastener bore 153 positioned between a pair of adjacent teeth 152. The teeth 152 may be shaped and dimensioned to form a curvic joint 165 with the curvic structure 135 of the aft planet carrier assembly 131.

In some embodiments, the curvic structure 135 of the aft planet carrier assembly 131 may comprise a plurality of teeth 151 defined by and extending away from the forward facing mounting surface 134. The forward facing mounting surface 134 may further define a plurality of fastener bores 154, with each fastener bore 154 positioned between a pair of adjacent teeth 151. The teeth 151 may be shaped and dimensioned to form a curvic joint 165 with the curvic structure 148 of the forward planet carrier assembly 161.

A fastener 155 may be positioned in each associated set of fastener bores 153, 154 that align when the curvic structures 135, 148 are positioned to form a curvic joint 165. In the illustrated embodiment of FIG. 9, the fastener 155 is a bolt and nut. A fastener 155 may be provided for each associated pair of fastener bores 153, 154.

Figure 12:
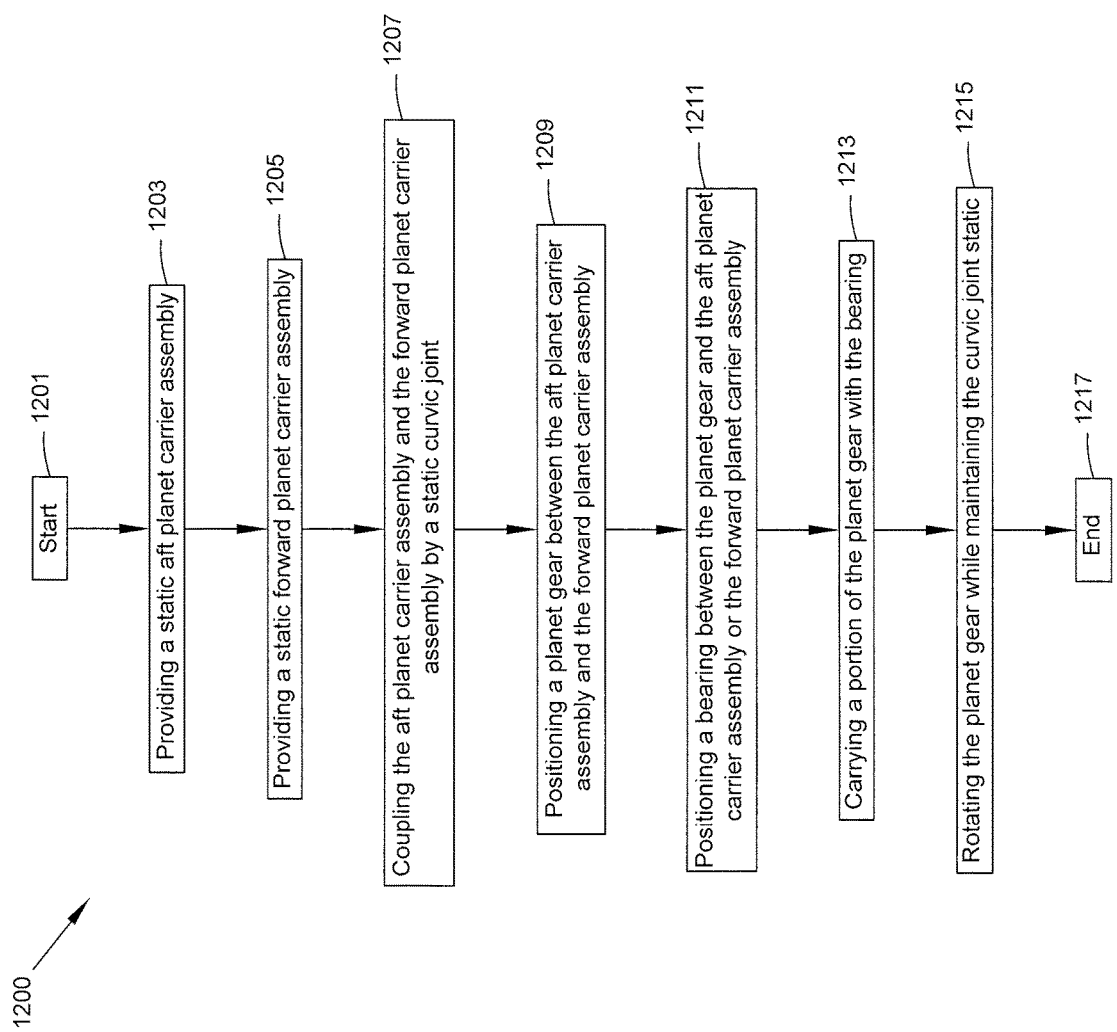
FIG. 12 is a flow diagram of a method in accordance with some embodiments of the present disclosure.

FIG. 12 is a flow diagram of a method 1200 of reducing relative movement between static components of an epicyclical gear system in accordance with some embodiments of the present disclosure. Method 1200 starts at Block 1201. The steps of method 1200, presented at Blocks 1201 through 1217, may be performed in the order presented in FIG. 12 or in another order. One or more steps of the method 1200 may not be performed.

At Block 1203 a static aft planet carrier assembly 131 may be provided. The aft planet carrier assembly 131 may comprise an aft flange 136 defining a central aperture 132 and an annular mounting flange 133 positioned forward of and coaxial with the central aperture 132. The annular mounting flange 133 may form a forward facing mounting surface 134 comprising a curvic structure 135. The aft flange 136 may further define a plurality of gear shaft pockets 137 positioned about the circumference and radially outward of the central aperture 132, each pocket having a cylindrical wall 138.

At Block 1205 a static forward planet carrier assembly 161 may be provided. The forward planet carrier assembly 161 may comprise a forward flange 162 defining a central aperture 144 and an annular mounting flange 143 positioned aft of and coaxial with the central aperture 144. The annular mounting flange 143 may form an aft facing mounting surface 147 comprising a curvic structure 148. The forward flange 162 may further define a plurality of gear shaft pockets 145 positioned about the circumference and radially outward of the central aperture 144, each pocket having a cylindrical wall 146.

At Block 1207 the aft planet carrier assembly 131 and the forward planet carrier assembly 161 may be coupled. The coupling may be achieved by mating the curvic structure 135 of the forward facing mounting surface 134 to the curvic structure 148 of the aft facing mounting surface 147 to thereby form a static curvic joint 165. The coupling of the aft planet carrier assembly and the forward planet carrier assembly may form a plurality of axially aligned gear shaft pocket pairs.

At Block 1209 one planet gear 105 of a plurality of planet gears may be positioned in each of the plurality of axially aligned gear shaft pocket pairs. Each planet gear 105 may comprise a cylindrical shaft 123 having a forward end portion 141 disposed in a gear shaft pocket 145 of the forward planet carrier assembly 161 coaxially with the cylindrical wall 146 of the pocket 145, and an aft end portion 142 disposed within a gear shaft pocket 137 of the aft planet carrier assembly 131 coaxially with the cylindrical wall 138 of the pocket 137. Each planet gear 105 may have one or more gears (e.g. sun gear engaging gear 125 and ring gear engaging gear 127) carried by the shaft 123 between the forward and aft end portions 141, 142.

At Block 1211 a bearing 119, 121 may be positioned at least partly in a gear shaft pocket 137, 145. At Block 1213 a portion of a cylindrical shaft 123 of a planet gear 105 may be carried with the bearing 119, 121.

At Block 1215 the cylindrical shaft 123 of each planet gear 105 may be rotated while maintaining the curvic joint 165 static. The rotation may be driven by a sun gear 101 of a compound star gear assembly.

Method 1200 ends at Block 1217.

The presently disclosed systems and methods provide numerous advantages over prior art systems. By providing a static (i.e. not rotating) curvic joint to join a forward and aft planet carrier assembly, the disclosed planet gear housing assembly reduces fore-to-aft misalignment of planet gear shafts caused by relative movement between the forward and aft planet carrier assemblies. The aft planet carrier assembly may be rigidly mounted to the engine casing. Through a static curvic joint, the forward planet carrier assembly may be held to the aft planet carrier assembly with less relative movement between the two than in a standard coupling. Less relative movement is advantageous during assembly as well as operation of the epicyclical gear system.

The disclosed static curvic joint is additionally advantageous during assembly of the epicyclical gear system. One contributor to fore-to-aft misalignment of the gear shaft of each planet gear may be the difficultly in reassembling the housings with the same alignment, orientation, and position with which they were machined. While machining accuracy can be improved by machining the housings together (e.g. line bored), the static curvic joint improves fore-to-aft alignment by reacting torque during the reassembly process and thus ensures close precision of bore alignment through manufacturing, machining, and assembly of the epicyclical gear system.

Although examples are illustrated and described herein, embodiments are nevertheless not limited to the details shown, since various modifications and structural changes may be made therein by those of ordinary skill within the scope and range of equivalents of the claims.

What is claimed is:

1. A planet gear housing assembly in an epicyclical gear assembly comprising:
   an aft planet carrier assembly comprising:
   an aft flange defining a central aperture and a plurality of gear shaft pockets positioned about the circumference and radially outward of said central aperture, each pocket having a cylindrical wall; and
   an annular mounting flange positioned forward of and coaxial with said central aperture, said mounting flange forming a forward facing mounting surface comprising a curvic structure, wherein said curvic structure of said forward facing mounting surface comprises a plurality of teeth extending away from the forward facing mounting surface, and wherein the forward facing mounting surface defines a plurality of fastener bores, with each fastener bore of the plurality of fastener bores positioned between adjacent teeth of the plurality of teeth;
a forward planet carrier assembly comprising:
  a forward flange defining a central aperture and a plurality of gear shaft pockets positioned about the circumference and radially outward of said central aperture, each pocket having a cylindrical wall; and
  an annular mounting flange positioned aft of and coaxial with said central aperture, said mounting flange forming an aft facing mounting surface comprising a curvic structure, wherein said curvic structure of said aft facing mounting surface comprises a plurality of teeth extending away from the aft facing mounting surface, and wherein the aft facing mounting surface defines a plurality of fastener bores, with each fastener bore of the plurality of fastener bores positioned between adjacent teeth of the plurality of teeth; and
a plurality of planet gears each comprising a cylindrical shaft having a forward end portion disposed in a gear shaft pocket of said forward planet carrier assembly coaxially with the cylindrical wall of said pocket, an aft end portion disposed within a gear shaft pocket of said aft planet carrier assembly coaxially with the cylindrical wall of said pocket, and one or more gears carried by said shaft between said forward and aft end portions;
wherein said curvic structures of said forward facing and aft facing mounting surfaces are positioned relative to each other to thereby form a static curvic joint.

2. The planet gear housing assembly of claim 1 wherein said annular mounting flange of said aft planet carrier assembly extends from the aft flange.

3. The planet gear housing assembly of claim 2 wherein said annular mounting flange of said forward planet carrier assembly extends from the forward flange.

4. The planet gear housing assembly of claim 3 wherein one or both of said annular mounting flange of said aft planet carrier assembly and said annular mounting flange of said forward planet carrier assembly extends substantially perpendicularly from a respective one of said aft flange and said forward flange.

5. The planet gear housing assembly of claim 1 wherein said aft flange comprises a radially outer mounting surface for mounting the planet gear housing assembly to an engine casing.

6. The planet gear housing assembly of claim 1 wherein said static curvic joint comprises the plurality of teeth extending away from the aft facing mounting surface enmeshed with the plurality of teeth extending away from the forward facing mounting surface.

7. The planet gear housing assembly of claim 1 wherein said static curvic joint further comprises a plurality of fasteners, with each fastener of the plurality of fasteners positioned through an aligned pair of fastener bores.

8. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein the gearbox has a planet gear housing assembly comprising:
an aft planet carrier assembly comprising:
  an aft flange defining a central aperture and a plurality of gear shaft pockets positioned about the circumference and radially outward of said central aperture, each pocket having a cylindrical wall; and
  an annular mounting flange positioned forward of and coaxial with said central aperture, said mounting flange forming a forward facing mounting surface comprising a curvic structure;
a forward planet carrier assembly comprising:
  a forward flange defining a central aperture and a plurality of gear shaft pockets positioned about the circumference and radially outward of said central aperture, each pocket having a cylindrical wall; and
  an annular mounting flange positioned aft of and coaxial with said central aperture, said mounting flange forming an aft facing mounting surface comprising a curvic structure;
and
a plurality of planet gears each comprising a cylindrical shaft having a forward end portion disposed in a gear shaft pocket of said forward planet carrier assembly coaxially with the cylindrical wall of said pocket, an aft end portion disposed within a gear shaft pocket of said aft planet carrier assembly coaxially with the cylindrical wall of said pocket, and one or more gears carried by said shaft between said forward and aft end portions;
wherein said curvic structures of said mounting surfaces are positioned relative to each other to thereby form a static curvic joint.

9. The gas turbine engine of claim 8 wherein each of said plurality of planet gears comprise a sun gear engaging gear and a ring gear engaging gear carried by said shaft between said forward and aft end portions.

10. The gas turbine engine of claim 8 wherein said shaft and gears form a compound star gear in an epicyclical gear system.

11. The gas turbine engine of claim 8 wherein said gearbox further comprises a roller element bearing disposed over at least a portion of one or both of the forward end portion and the aft end portion of said gear shaft.

12. The gas turbine engine of claim 8 wherein said curvic structure of said aft facing mounting surface and said forward facing mounting surface each comprise a plurality of teeth extending away from the respective one of said aft facing mounting surface and said forward facing mounting surface.

13. A method of reducing relative movement between static components of an epicyclical gear system, the method comprising:
providing a static aft planet carrier assembly comprising:
  an aft flange defining a central aperture; and
  an annular mounting flange positioned forward of and coaxial with said central aperture, said mounting flange forming a forward facing mounting surface comprising a curvic structure;
providing a static forward planet carrier assembly comprising:
  a forward flange defining a central aperture; and
  an annular mounting flange positioned aft of and coaxial with said central aperture, said mounting flange forming an aft facing mounting surface comprising a curvic structure;
coupling said aft planet carrier assembly and said forward planet carrier assembly by mating the curvic structure of the forward facing mounting surface to the curvic structure of the aft facing mounting surface to thereby form a static curvic joint, wherein said aft flange further defines a plurality of gear shaft pockets positioned about the circumference and radially outward of said central aperture, each pocket having a cylindrical wall:

wherein said forward flange further defines a plurality of gear shaft pockets positioned about the circumference and radially outward of said central aperture, each pocket having a cylindrical wall; and wherein the coupling of said aft planet carrier assembly and said forward planet carrier assembly forms a plurality of axially aligned gear shaft pocket pairs.

14. The method of claim 13 further comprising:

positioning one planet gear of a plurality of planet gears in each of the plurality of axially aligned gear shaft pocket pairs, each planet gear comprising a cylindrical shaft having a forward end portion disposed in a gear shaft pocket of said forward planet carrier assembly coaxially with the cylindrical wall of said pocket, an aft end portion disposed within a gear shaft pocket of said aft planet carrier assembly coaxially with the cylindrical wall of said pocket, and one or more gears carried by said shaft between said forward and aft end portions.

15. The method of claim 14 further comprising:

positioning a bearing at least partly in a gear shaft pocket; and carrying a portion of a cylindrical shaft of a planet gear with said bearing.

16. The method of claim 15 further comprising:

rotating said cylindrical shaft of each planet gear while maintaining the curvic joint static.

17. The method of claim 16 wherein said rotation is driven by a sun gear of a compound star gear assembly.

* * * * *